Oct. 16, 1951 A. A. NIMS, JR 2,571,929

PULSE COUNTER CIRCUIT

Filed April 14, 1950 3 Sheets-Sheet 1

WITNESSES:

E. A. McCloskey

Wm. L. Groome

INVENTOR

Albert A. Nims, Jr.

BY F. E. Browder

ATTORNEY

Oct. 16, 1951 A. A. NIMS, JR 2,571,929

PULSE COUNTER CIRCUIT

Filed April 14, 1950 3 Sheets-Sheet 2

WITNESSES:

E. A. McCloskey.

Wm. L. Groome

INVENTOR

Albert A. Nims, Jr.

BY F. E. Browder

ATTORNEY

Oct. 16, 1951 A. A. NIMS, JR 2,571,929

PULSE COUNTER CIRCUIT

Filed April 14, 1950 3 Sheets-Sheet 3

WITNESSES:

E. A. McCloskey

Wm. L. Groome

INVENTOR

Albert A. Nims, Jr.

BY

F. E. Browder

ATTORNEY

Patented Oct. 16, 1951

2,571,929

UNITED STATES PATENT OFFICE 2,571,929

PULSE COUNTER CIRCUIT

Albert A. Nims, Jr., Baltimore, Md., assignor to Westinghouse Electric Corporation, East Pittsburgh, Pa., a corporation of Pennsylvania Application April 14, 1950, Serial No. 155,821

19 Claims. (Cl. 250—27)

This invention relates to pulse generating circuits, and it relates more particularly to circuits for the production of high voltage pulses from a low voltage source.

My copending application, Serial No. 102,125 filed June 29, 1949, assigned to the assignee of the present application, discloses a pulse generating circuit having a pulse-forming network, in which one electronic switch is used for causing the network to discharge, and in which a second electronic switch is used for providing substantially a short circuit across the load to which the network is connected, for causing the voltage across the network to reverse so as to be added to the supply voltage, whereby, through recycling, a high voltage to be supplied to the load is built up. The two switches are triggered simultaneously by pulses from external, trigger pulse sources during the building up of the high voltage, and when the voltage has been built up to the desired value, only the first pulse is triggered, the second switch remaining open.

This invention adds to such a pulse generating circuit, means responsive to the high voltage built up through recycling for terminating the recycling together with means for counting the number of cycles required for building up the desired high voltage, and means for providing pulses having a frequency of which the frequency of the counted pulses is a multiple.

An object of the invention is to build up high voltage pulses from a low voltage source, and to use the high voltage to terminate the recycling when it has reached the desired value.

Another object of the invention is to count the number of pulses required for producing a desired effect in a pulse generating circuit.

Another object of the invention is to count the number of pulses required for building up a desired high voltage in a pulse generating circuit in which electronic switches are triggered for causing the voltage across a pulse-forming network to reverse and to be added to the supply voltage.

Another object of the invention is to count the number of pulses required for producing a desired effect in a pulse generating circuit, and to provide other pulses having a frequency of which the frequency of the counted pulses is a multiple.

Another object of the invention is to provide from pulses having a given frequency, other pulses having a frequency of which the frequency of the first mentioned pulses is a multiple.

The invention will now be described with reference to the drawings, of which:

Figure 1:
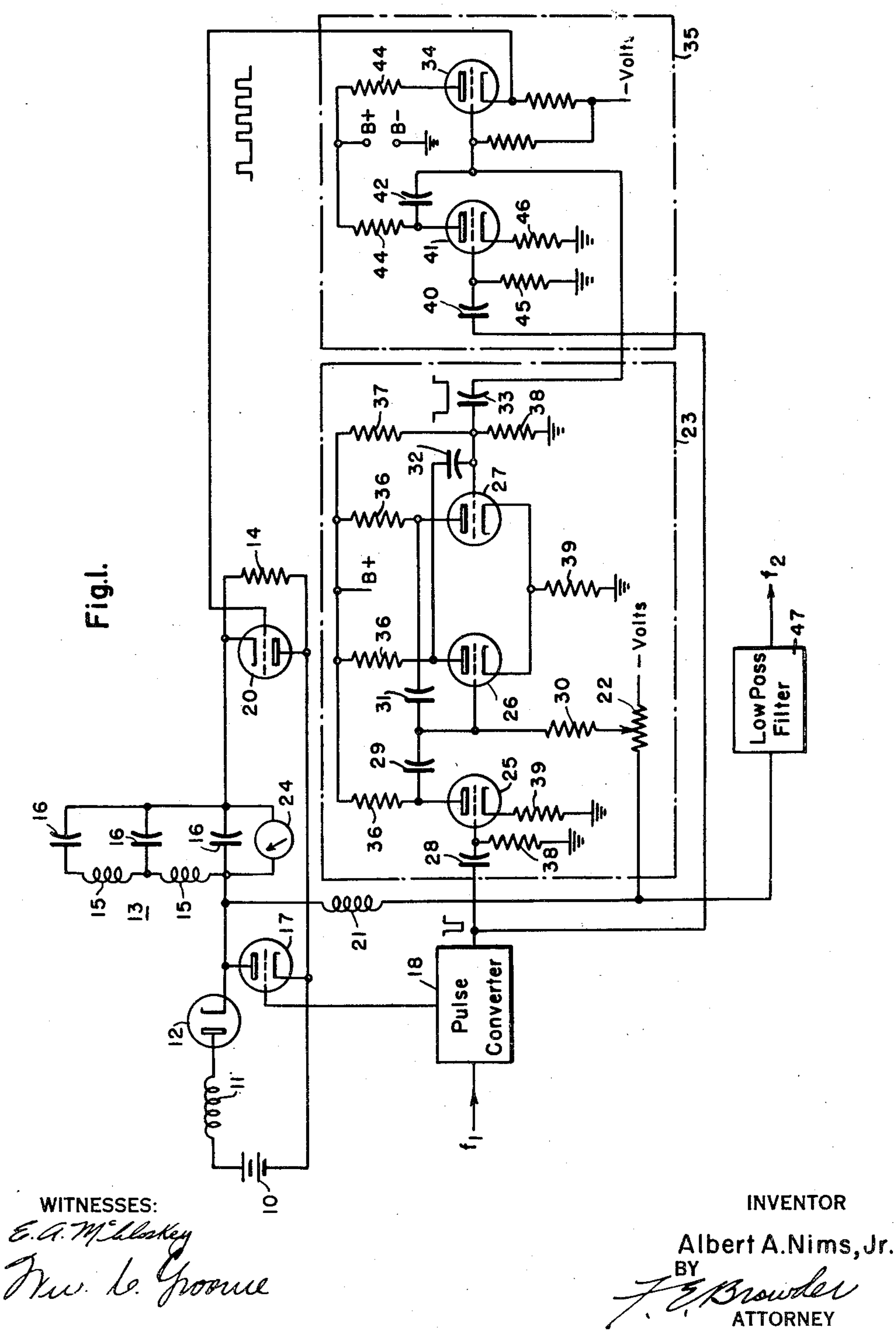
Fig. 1 is a circuit schematic of one embodiment of the invention.

Referring first to Fig. 1 of the drawings, the battery 10 which serves as a source of supply voltage, is connected in series with the charging choke 11, the hold-off diode tube 12, the pulse-forming network 13 and the load 14. The network 13 is a conventional, open-ended, transmission line section having the series-connected inductors 15 and the capacitors 16 connected thereto.

The thyratron tube 17 is connected as an electronic switch across the circuit, its plate being connected to the junction point of the diode tube and the network, and its cathode being connected between the load and the negative terminal of the battery. The pulse converter 18 is connected to the control grid of the tube 17.

The thyratron tube 20 has its cathode connected in the circuit between the network and the load, and is connected to ground and has its plate connected in the circuit between the load and the negative terminal of the battery 10.

The isolating choke 21 is connected at one end in the circuit between the plate of the tube 17 and the network 13, and is connected at its other end to one side of the potentiometer 22 which serves as a count control. The other side of the potentiometer 22 is connected to a conventional source, such as a battery, of negative voltage. The voltmeter 24 is connected between the hold off diode 12 and the pulse forming network 13 on one side and to ground on the other side and serves as a pulse or cycle counter. The operation of the count control 22 and of the pulse counter 24 will be described later in the description of the operation of the circuit.

The gate control 23 is a conventional, one-cycle multivibrator having a trigger tube 25 and the multivibrator tubes 26 and 27. The control grid of the tube 25 is connected through the coupling capacitor 28 to the pulse converter 18, and its plate is connected through the coupling capacitor 29 to the control grid of the tube 26. The control grid of the tube 26 is connected through the resistor 30 to the slider of the potentiometer 22, and is connected through the coupling capacitor 31 to the plate of the tube 27. The control grid of the tube 27 is connected through the coupling capacitor 32 to the plate of the tube 26, and is connected through the coupling capacitor 33 to the control grid of the tube 34 of the gated pulse amplifier 35.

The plates of the tubes 25, 26 and 27 are connected through the resistors 36, and the control grid of the tube 27 is connected through the resistor 37, to a positive high voltage terminal of a conventional, direct current supply source which is not illustrated. The control grids of the tubes 25 and 27 are connected through the grid resistors 38 to ground, and the cathodes of the tubes 25, 26 and 27 are connected through the bias resistors 39 to ground.

The pulse converter 18 is connected through the coupling capacitor 40 to the control grid of the tube 41 in the gated pulse amplifier 35. The plate of the tube 41 is connected through the coupling capacitor 42 to the control grid of the tube 34. The cathode of the tube 34 is connected to the control grid of the thyratron tube 20.

The plates of the tubes 34 and 41 are connected through the resistors 44 to the high voltage, direct current source. The control grid of tube 41 is connected through the grid resistor 45 to ground, and its cathode is connected through the bias resistor 46 to ground. The cathode of tube 34 is connected to a conventional source of negative D. C. voltage, not shown, and the control grid of tube 34 is connected through grid resistor 45 to the same source of negative voltage.

The end of the isolating choke 21 which is connected to the potentiometer 22 is also connected to the low-pass filter 47.

The pulse converter 18 receives sine-wave current from a conventional alternating current source which is not illustrated and which has a frequency $f_1$. It converts the sine-wave current into positive and negative pulses having the same frequency, and which are used to trigger the tubes 17, 25 and 34 as will be described.

In operation, immediately following a pulse from the network 13, or when the battery 10 is first connected in the circuit with the tube 17 non-conducting, since the resistance of the LC circuit including the network, is low, the circuit will oscillate. The tube 17 is triggered by a positive pulse from the converter 18, so that it conducts and effectively closes a switch across the circuit at the end of the first half-cycle of operation for forming a pulse in the network when the voltage across its capacity is about twice that of the battery. A current having a voltage equal to one-half this voltage will then flow from the network into the load 14 when the tube 20 is non-conducting. The pulse is initiated when the tube 17 begins conducting, and ends when the wave induced in the network is reflected back from its open end in proper phase. All of the voltage applied across the network and the load appears as charges in the capacitors 16. At this time there is no voltage across the load and across the tube 17 so that the pulse is terminated, and the tube stops conducting and is ready for the next cycle.

The tube 20 is triggered by a pulse from the gated pulse amplifier during a portion of its operation, at the same time the tube 17 is triggered by a pulse from the converter 18. The tube 20 then conducts at the same time the tube 17 conducts for several cycles. The tube 20 thus forms a short-circuit across the load when it is triggered, and prevents pulses from the network from being supplied to the load. The resulting mismatch of impedance causes the voltage across the network to reverse and to appear in series with that of the battery 10. Since this reverse voltage, assuming no loss in the circuit, is about twice the battery voltage, the voltage available for producing the next pulse is about three times the battery voltage, and the voltage across the network when the next pulse is formed, is about twice this voltage, or about six times the battery voltage.

The plate of the tube 20 obtains its voltage from that built up across the load 14, which voltage becomes negative when the voltage across the network reverses, at which time the tube 20 ceases to conduct and is ready for the next cycle.

As the recycling continues, the voltage across the network continues to build up until a desired voltage is reached. At that time the amplifier 35 fails to deliver a trigger pulse to the tube 20 which then becomes a shunt high impedance having substantially no effect upon the circuit. Then upon the next cycle, the high voltage pulse is delivered by the network to the load and the network is completely discharged.

The high voltage built up across the network by the recycling described in the foregoing, is supplied through the isolating choke 21 to one end of the potentiometer 22 where it appears as a positive voltage in opposition to the negative voltage at the other end of the potentiometer. While the voltage is building up to a desired value through recycling, the negative bias on the grid of the multivibrator tube 26 remains so far below cut-off that a trigger pulse from the trigger tube 25 cannot cause it to conduct. When the voltage through the choke 21 has built up to the desired value, the bias on the grid of the tube 26 will rise until a pulse from the trigger tube 25 will initiate the multivibrator cycle.

The output of the multivibrator is a negative pulse which is long enough to include the next trigger pulse, and is supplied through the coupling capacitor 33 to the control grid of the tube 34, for gating the amplifier 35 for causing its output to provide groups of uniformly spaced pulses with a pulse missing between each group. These pulses are supplied to the control grid of the tube 20, whereby this tube recycles with the tube 17 except when a pulse is periodically missing at which time it fails to conduct so that the network 13 can discharge into the load. When this happens, the voltage through the isolating choke 21 will fall to zero, so that the multivibrator will cease operation and the amplifier 35 will become ungated until through recycling the desired high voltage is again built up.

The voltage across the choke 21 is a function of the number of pulses involved in the recycling, so that the voltmeter 24 connected across the choke can be calibrated to indicate the number of pulses required to build up the voltage to be delivered to the load.

The slider of the potentiometer 22 can be adjusted to vary the bias on the grid of the multivibrator tube 26, and therefore, the recycling of the tube 20 and the resulting voltage built across the network. The potentiometer can be calibrated so that the position of its slider will indicate the number of cycles required for building up the desired high voltage.

Figure 4:
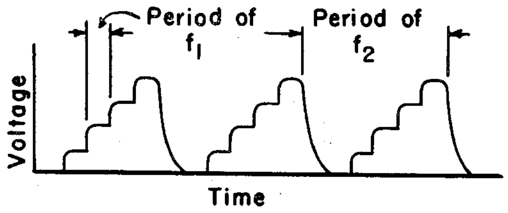
Fig. 4 is a view of the wave form of the current entering the low pass filters of Figs. 1 and 4 of the drawings.
Figure 5:
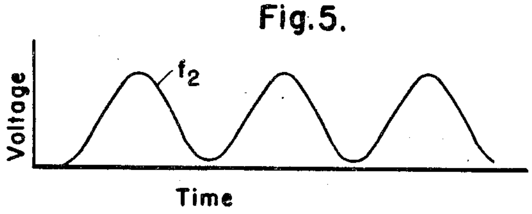
Fig. 5 is a view of the wave form of the current leaving the low pass filter of Figs. 1 and 3 of the drawings.

Fig. 4 illustrates the wave of the current from the choke 21 to be a serrated sawtooth wave. It builds up from zero to maximum voltage in steps having widths equal to the period of the voltage $f_1$ supplied into the pulse converter 18. When the voltage from the choke reaches its maximum value it collapses to zero again. By passing the current from the choke through the low-pass filter 47, the ripples on the waves will be removed so that an alternating current having a frequency $f_2$, of which the frequency $f_1$ is a multiple, can be obtained.

Figure 2:
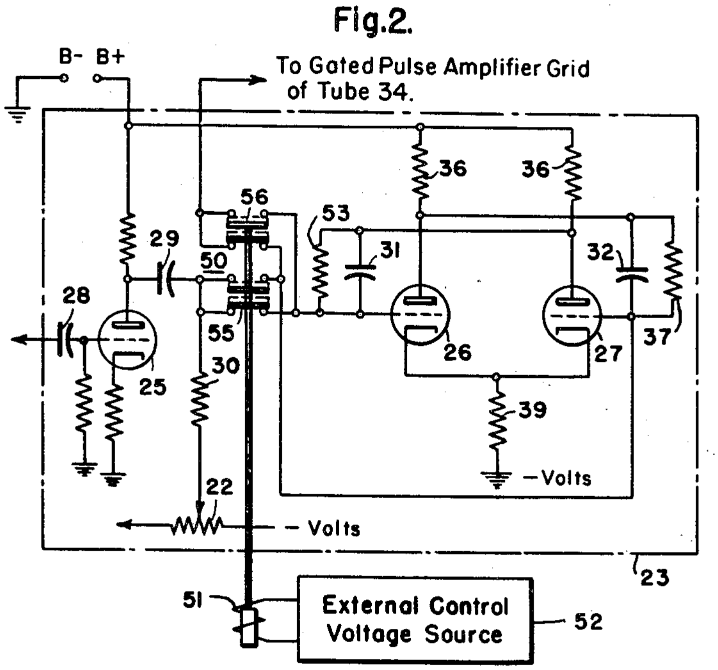
Fig. 2 is a circuit schematic of another form of gate control which may be used in the circuit of Fig. 1.

Fig. 2 of the drawings illustrates a modification of the gate control which is arranged to leave the gated pulse amplifier 25 gated until reset by an external electrical impulse, or by hand, etc., in which case, the voltage through the choke 21 will remain zero until the circuit is reset. The double pole, double-throw relay 50 has its energizing winding 51 connected to an external control voltage source 52, and is arranged to cause the multivibrator to be triggered twice for a full cycle or once for each half-cycle. This type of multivibrator is generally referred to as a "scale-of-two" type.

The multivibrator tube 26 has its control grid connected through the resistor 53 and 36 to the high voltage, direct current source, and through the grid resistor 30 to a conventional source of negative D. C. voltage, not shown. When the switch arms 55 and 56 of the relay 50 are in the positions illustrated by the continuous lines of Fig. 2 of the drawings, the input of the multivibrator is connected through the switch arm 55 to the trigger tube 25 and to the slider of the potentiometer 22, and its output is directly coupled through the switch arm 56 to the gated pulse amplifier 35. In this circuit when the desired high voltage has been built up, and the voltage through the choke 21 drops to zero, the system will count once and then stop.

The counting can then be started again by causing the switch arms 55 and 56 to move to the positions shown by the dashed lines of Fig. 2 of the drawings. When in the dashed line positions, the switch arm 55 connects the trigger tube and the slider of the potentiometer 22, to the multivibrator tube 27, and the switch arm 56 connects the amplifier 35 to the tube 26. The system will again count once and then stop.

The relay 50 has no on-off position. The trigger tube and the slider of the potentiometer 22 are connected to one side or other of the multivibrator except during the switching.

The switching by the relay 50 can be accomplished at any desired rate by the electrical source 52. The switch arms 55 and 56 could be the switch arms of a manually operated double pole, double-throw switch.

Figure 3:
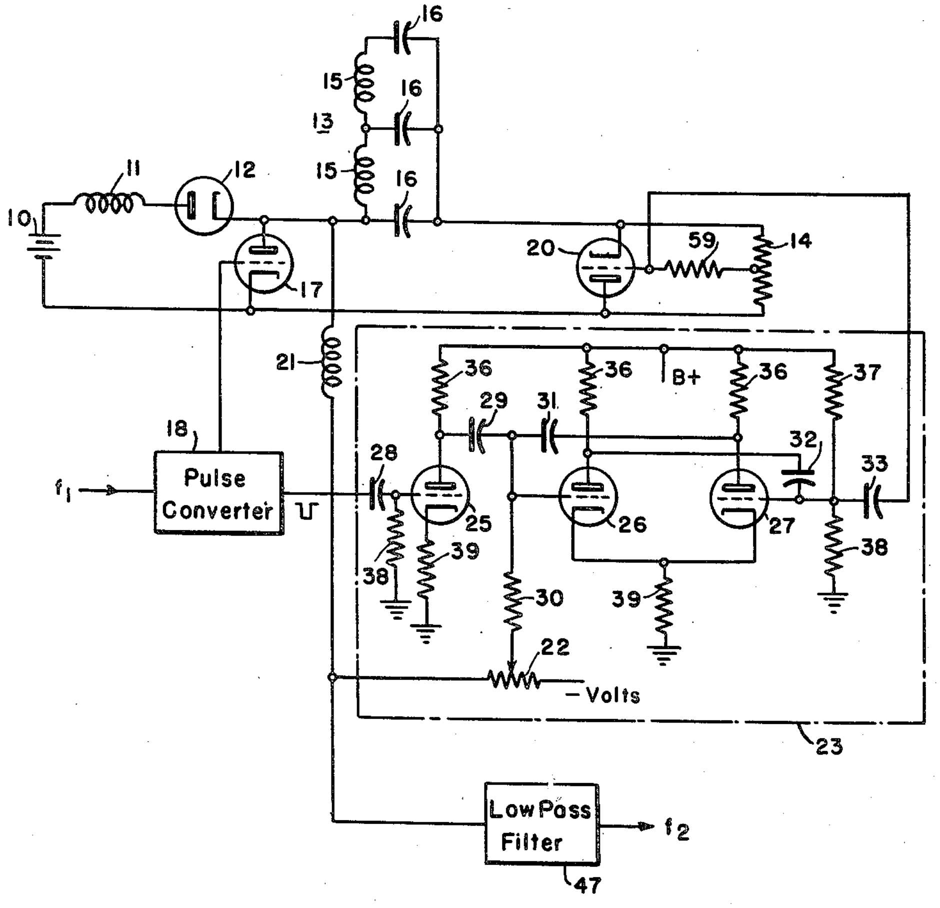
Fig. 3 is a circuit schematic of another embodiment of the invention.

In the circuit of Fig. 3 of the drawings, the tube 20 instead of normally being non-conductive and rendered conductive by positive pulses as in the circuit of Fig. 1 of the drawings, is biased so that it is normally conducting during the discharge of pulse forming network 13. The multivibrator 23 has its output connected through the coupling capacitor 33 to the control grid of the tube 20, which is also connected through the resistor 59 to a required position above ground on the load resistor 14.

The tube 20 remains a short circuit across the load 14 during the recycling of the system. When the desired high voltage has been built up in the network, the positive pulse from the trigger tube 25 and the positive voltage through the choke 21 to the potentiometer 22, cause the initiation of operation of the multivibrator which delivers a negative voltage pulse to the tube 20 which will shut the tube off for permitting the network to discharge into the load 14, and the recycling to start again.

I claim as my invention:

1. A pulse circuit comprising a low voltage source, a pulse-forming network, means for charging said network from said source, recycling means normally energized for causing the voltage across said network periodically to reverse and appear in series with the voltage from said source whereby through the recycling a desired high voltage is built up across said network, and means connected to said network for deenergizing said recycling means when the desired high voltage has been built up.

2. A pulse circuit for generating high voltage pulses, comprising a low voltage source, a pulse-forming network connected in series with said source, a first switch means connected across the circuit between said source and one side of said network, a second switch means connected across the circuit at the other side of said network for discharging with said first switch means, said network, means for periodically opening and closing said first and second switch means, and means responsive to the voltage at said one side of said network for holding said second switch means open when said first switch is closed when the voltage has reached a desired value.

3. A pulse circuit as claimed in claim 1 in which the means for deenergizing the recycling means is responsive to voltage from the network.

4. A pulse circuit comprising a low voltage source, a pulse forming network, means for charging said network from said source, recycling means normally energized for causing the voltage across said network periodically to reverse and appear in series with the voltage from said source whereby through the recycling a desired high voltage is built up across said network, means for deenergizing said recycling means when the desired high voltage has been built up, and means for indicating the number of cycles required by said recycling means for building up said desired high voltage.

5. A pulse circuit as claimed in claim 4 in which the means for deenergizing the recycling means is responsive to voltage from the network.

6. A pulse circuit as claimed in claim 4 in which the means for indicating the number of cycles, is connected to the network.

7. A pulse circuit as claimed in claim 4 in which the means for deenergizing the recycling means and for indicating the number of cycles, is connected to the network.

8. A pulse circuit comprising a low voltage source, a pulse-forming network, means for charging said network from said source, recycling means for causing the voltage across said network periodically to reverse and appear in series with the voltage from said source whereby a desired high voltage is built up across said network, means for deenergizing said recycling means when the desired high voltage has been built up, and means comprising a filter connected to said circuit for providing a current having a frequency of which the cycling frequency of said recycling means is a multiple.

9. A pulse circuit as claimed in claim 8 in which the means for deenergizing the recycling means is responsive to voltage from the network.

10. A pulse circuit as claimed in claim 8 in which means connected to the network is provided for indicating the number of cycles required by the recycling means for building up the desired high voltage.

11. A pulse circuit as claimed in claim 8 in which the means for deenergizing the recycling means is responsive to voltage from the network, and in which means connected to the network is provided for indicating the number of cycles required by the recycling means for building up the desired high voltage.

12. A pulse circuit for generating high voltage pulses, comprising a low voltage source, a pulse-forming network connected in series with said source, a first switch means connected across the circuit between said source and one side of the network, a second switch means connected across the circuit at the other side of said network, for discharging with said first switch, said network, means for periodically closing said first and second switch means for causing the voltage across said network to reverse and to appear in series with the voltage from said source, and through recycling to build up to a desired high value, means responsive to voltage from said one side of said network for holding said second switch means open when said first switch means is closed when the desired high voltage has been built up, and means connected to said one side of said network for indicating the number of cycles required for building up said desired high voltage.

13. A pulse circuit as claimed in claim 12 in which means comprising a filter is connected to the circuit for providing a current having a frequency of which the recycling frequency is a multiple.

14. A pulse circuit for generating a desired high voltage, comprising a low voltage source, a pulse-forming network connected in series with said source, a first switch means arranged to be connected across the circuit between said source and one side of said network, a second switch means arranged to be connected across the circuit at the other side of said network for discharging with said first switch means, said network, and for causing the voltage across the network to reverse and to appear in series with the voltage from said source, and through recycling to build up said desired high voltage, a source of trigger pulses connected to said first switch means for periodically closing same, means including a multivibrator connected to said trigger pulse source and to said second switch means for closing said second switch means when said first switch means closes, and means including means connected to, and responsive to voltage from, said one side of said network for causing said means including said multivibrator to cause said second switch means to remain open when said first switch means is closed when the desired high voltage has been generated.

15. A pulse circuit as claimed in claim 14 in which the means including a multivibrator includes a gated pulse amplifier between the multivibrator and the second switching means, which is connected to said trigger pulse source, and which is gated by the multivibrator so as to cause it to supply trigger pulses to said second switch means except when said desired high voltage has been generated.

16. A pulse circuit as claimed in claim 14 in which the multivibrator has an input and an output and includes a trigger tube connected to the trigger pulse source and to the means connected to the one side of the network, and in which switching means is provided for connecting the input of the multivibrator to the trigger tube and the output of the multivibrator to the second switching means, and for alternatively connecting the output of the multivibrator to the trigger tube and the input of the multivibrator to the second switching means.

17. A pulse circuit for generating a desired high voltage, comprising a low voltage source, a pulse-forming network connected in series with said source, a first switch means arranged to be connected across the circuit between said source and one side of said network, a second switch means normally connected across the circuit at the other side of said network for discharging with said first switch means when same is closed, said network, for causing the voltage across said network to reverse and to appear in series with the voltage from said source, and through recycling to build up said desired high voltage, means for periodically closing said first switch means, and means for opening said second switch means when said desired high voltage has been generated.

18. A pulse circuit as claimed in claim 17 in which the means for opening the second switch means is responsive to the voltage at said one side of said network.

19. A pulse circuit as claimed in claim 17 in which the means for opening the second switch means is a multivibrator connected to the trigger pulse source and to said one side of said network.

ALBERT A. NIMS, Jr.

REFERENCES CITED

The following references are of record in the file of this patent:

UNITED STATES PATENTS

| Number | Name | Date |
|---|---|---|
| 2,301,197 | Bradford | Nov. 10, 1942 |
| 2,432,292 | Deal | Dec. 9, 1947 |
| 2,469,977 | Morrison | May 10, 1949 |